(12) United States Patent
Yamada et al.

(10) Patent No.: US 8,579,465 B2
(45) Date of Patent: Nov. 12, 2013

(54) PLANT GROWING SYSTEM

(75) Inventors: Makoto Yamada, Matsudo (JP); Masaki Ishiwata, Inzai (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 13/241,646

(22) Filed: Sep. 23, 2011

(65) Prior Publication Data

US 2012/0075848 A1 Mar. 29, 2012

(30) Foreign Application Priority Data

Sep. 27, 2010 (JP) ................................. 2010-216088

(51) Int. Cl.
| | | |
|---|---|---|
| *F21V 9/10* | (2006.01) | |
| *F21V 9/02* | (2006.01) | |
| *H05B 35/00* | (2006.01) | |
| *H05B 37/02* | (2006.01) | |
| *A01G 9/20* | (2006.01) | |

(52) U.S. Cl.
USPC ............... 362/231; 362/2; 362/230; 362/293; 362/805; 47/17; 315/323

(58) Field of Classification Search
USPC .............. 362/1, 2, 230, 231, 293, 805; 47/17, 47/19.1, 58.1 LS, DIG. 6; 315/323
See application file for complete search history.

(56) References Cited

U.S. PATENT DOCUMENTS

| | | | | |
|---|---|---|---|---|
| 4,146,993 | A | * | 4/1979 | Freeman, Sr. ..................... 47/17 |
| 5,012,609 | A | * | 5/1991 | Ignatius et al. ............ 47/1.01 R |
| 6,921,182 | B2 | * | 7/2005 | Anderson et al. ............. 362/231 |
| 7,012,384 | B2 | * | 3/2006 | Tatewaki et al. .............. 315/323 |
| 8,458,954 | B2 | * | 6/2013 | Yamada et al. .......... 47/58.1 LS |

FOREIGN PATENT DOCUMENTS

| | | |
|---|---|---|
| CN | 2438321 | 7/2001 |
| CN | 201011650 | 1/2008 |
| CN | 101408293 | 4/2009 |
| JP | 2006-67948 | 3/2006 |
| JP | 2007-282544 | 11/2007 |
| JP | 2009-136155 | 6/2009 |

OTHER PUBLICATIONS

Office Action dated Apr. 7, 2012 issued in corresponding Chinese application No. 201110294292.0.

* cited by examiner

*Primary Examiner* — Alan Cariaso
(74) *Attorney, Agent, or Firm* — Bacon & Thomas, PLLC

(57) ABSTRACT

A plant growing system of the present invention includes: a first light source for irradiating red light to a plant; a second light source for irradiating far-red light to the plant; a control part that controls irradiation operations of the first light source and the second light source; and a time setting part that sets a time zone in which the control part operates the irradiation of the first light source and the second light source. The time setting part is designed such that the first light source starts red light irradiation before sunset; and the second light source starts far-red light irradiation after the red light irradiation.

9 Claims, 7 Drawing Sheets

—— RED LIGHT EXAMPLE 1 (FLOURESCENT LAMP AND RED FILTER) EMITTED FROM FIRST LIGHT SOURCE
—·— RED LIGHT EXAMPLE 2 (RED LED) EMITTED FROM FIRST LIGHT SOURCE
······ FAR-RED LIGHT EXAMPLE 1 (FLOURESCENT LAMP AND FAR-RED FILTER) EMITTED FROM SECOND LIGHT SOURCE
---- FAR-RED LIGHT EXAMPLE 2 (FAR-RED LED) EMITTED FROM SECOND LIGHT SOURCE

— SUNLIGHT

▒ RED LIGHT EMITTED FROM FIRST LIGHT SOURCE
(PEAK WAVELENGTH=630 nm, 0.1 W/cm²)

▓ FAR-RED LIGHT EMITTED FROM FIRST LIGHT SOURCE
(PEAK WAVELENGTH=735 nm, 0.02 W/cm²)

— SUNLIGHT
▬ RED LIGHT EMITTED FROM FIRST LIGHT SOURCE
(PEAK WAVELENGTH=630 nm, 0.1 W/cm$^2$)

— SUNLIGHT
▬ FAR-RED LIGHT EMITTED FROM FIRST LIGHT SOURCE
(PEAK WAVELENGTH=735 nm, 0.02 W/cm$^2$)

PLANT GROWING SYSTEM

FIELD OF THE INVENTION

The invention relates to a plant growing system for accelerating growth of plants.

BACKGROUND OF THE INVENTION

Conventionally, there is known a plant growing method in which artificial light is irradiated to a plant to modulate its growth rate, bloom time, and the like. It is reported, for instance, that growth of a short-day plant such as chrysanthemum and a day-neutral plant is promoted by being irradiated with far-red light after sunset (see JP2006-67948A).

In the growth promoting method of the short-day and day-neutral plants, the plants are irradiated with monochromatic far-red light. The light irradiated to the plants, however, not necessarily monochromatic, but a plurality of lights with different wavelengths may be used.

As one example of the plant growing method by utilizing two kinds of lights with different wavelengths, it is reported that at least one of red light and far-red light is irradiated to a solanaceous plant (tomato) for 1 to 3 hours after sunset in order to obtain high sugar tomato (see JP2007-282544A).

As another example, a short-day-treatment method of accelerating a bloom time of a short-day plant, is disclosed (see JP2009-136155A). In this method, a short-day plant is irradiated with red light and far-red light simultaneously at both and/or either of near the beginning and the end of a day-light phase in a photoperiod of the short-day plant.

In the method disclosed in JP2006-67948A, however, the far-red light irradiated to a plant has only a weak growth promotion effect.

In the method described in JP2007-282544A, at least either of the red light and the far-red light irradiated to a tomato does not necessarily accelerate the growth of the tomato, although it increases the sugar content of the tomato. This method is limited to a tomato, but cannot necessarily be applied to other plants.

In the system disclosed in JP2009-136155A, the red light and the far-red light irradiated simultaneously to a short-day plant do not necessarily promote the growth of the short-day plant, although they accelerate the bloom time of the short-day plant.

SUMMARY OF THE INVENTION

In view of the above, an object of the present invention is to provide a plant growing system for promoting growth of a plant remarkably.

In accordance with the present invention, there is provided a plant growing system including: a first light source for irradiating red light to a plant; a second light source for irradiating far-red light to the plant; a control part that controls irradiation operations of the first light source and the second light source; and a time setting part that sets a time zone in which the control part operates the irradiation of the first light source and the second light source, wherein the time setting part is designed such that the first light source starts red light irradiation before sunset; and the second light source starts far-red light irradiation after the red light irradiation. In the plant growing system, the time setting part is preferably designed such that the second light source starts the far-red light irradiation after the red light irradiation of the first light source is completed. Further, in the plant growing system, the first light source preferably has a peak wavelength in a range of 610 to 680 nm and the second light source has a peak wavelength in a range of 685 to 780 nm.

In the plant growing system, the first light source and the second light source are preferably realized by controlling a wavelength of light emitted from a single light source.

In the plant growing system, the second light source preferably emits the far-red light with irradiance of 0.02 W/m$^2$ or more and integral irradiance per day of 0.2 kJ/m$^2$ or more. Further, the time setting part is preferably designed such that the first light source emits the red light until a first time zone near sunset; and the second light source emits the far-red light until a second time zone near sunset.

In the plant growing system, it is preferred that each of the first light source and the second light source includes a filter through which sunlight passes; and the second light source emits the far-red light with irradiance of 0.5 W/m$^2$ or more and integral irradiance per day of 1 kJ/m$^2$ or more. Further, the time setting part is preferably designed such that the second light source emits the far-red light from near the end of red light irradiation of the first light source until near sunset. In the plant growing system, the filter of the first light source is preferably a red filter passing the red light with a wavelength in a range of 610 to 680 nm therethrough and the filter of the second light source is a far-red filter passing the far-red light with a wavelength in a range of 685 to 780 nm therethrough.

According to the plant growing system of the present invention, a plant is continuously irradiated with the red light and the far-red light near sunset, thereby promoting the growth of the plant remarkably as compared with that of the conventional technique.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

First Embodiment

A plant growing system in accordance with a first embodiment of the present invention will be described with reference to FIGS. 1 to 8. The plant growing system 1, which promotes growth of plants, is used for growing plants (especially, flowering plants), for example, in a fully closed type of plant seedling producing system, cultivation under facilities such as a plastic greenhouse and a glasshouse for agriculture, or outdoor cultivation.

Figure 1:
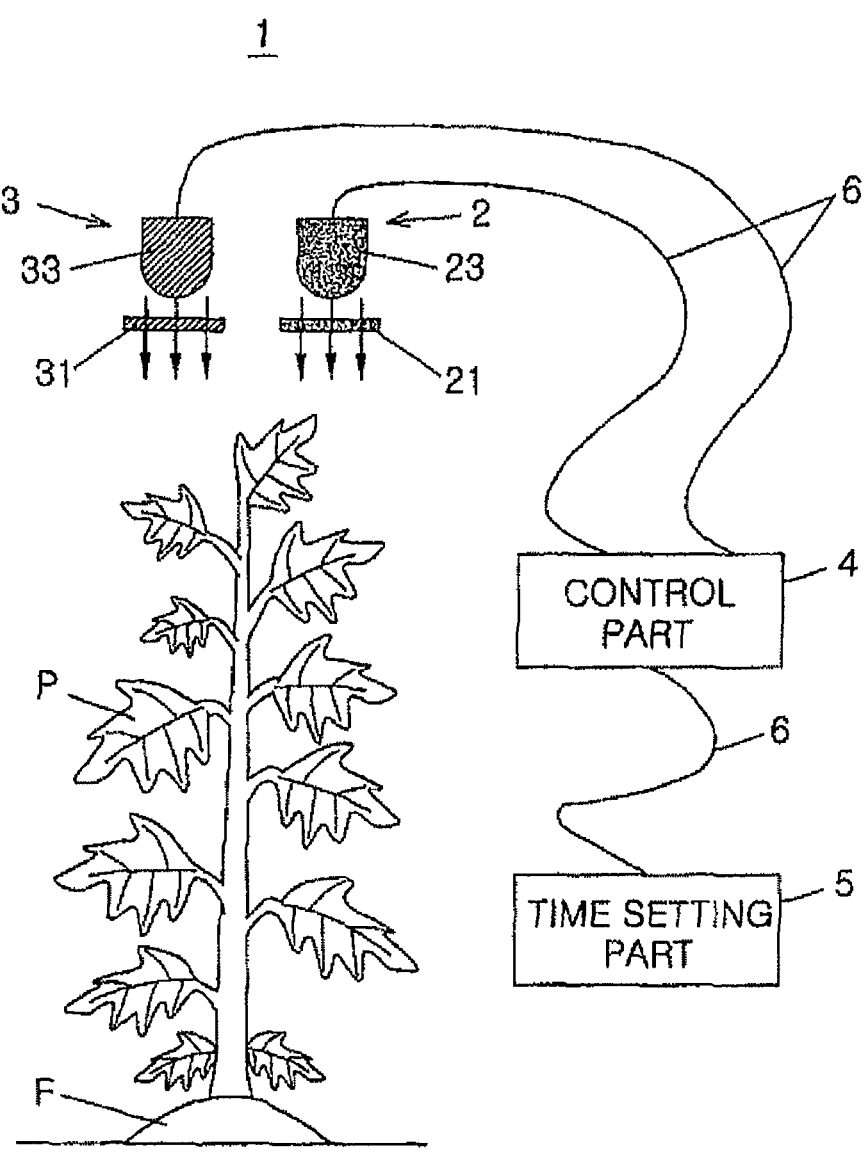
FIG. 1 is a front view showing a structure of a plant growing system in accordance with a first embodiment of the present invention.

As shown in FIG. 1, the plant growing system irradiates a plant P planted in a ridge F with light to enhance the growth of the plant P. The plant growing system 1 includes a first light source 2, a second light source 3, a control part 4 controlling an irradiation operation of these light sources, and a time setting part 5 determining a time zone in which the control part 4 operates the irradiation of these light sources. Herein, the control part 4 is electrically connected to the first light source 2, the second light source 3, and the time setting part 5 through respective power lines 6.

Figure 2:
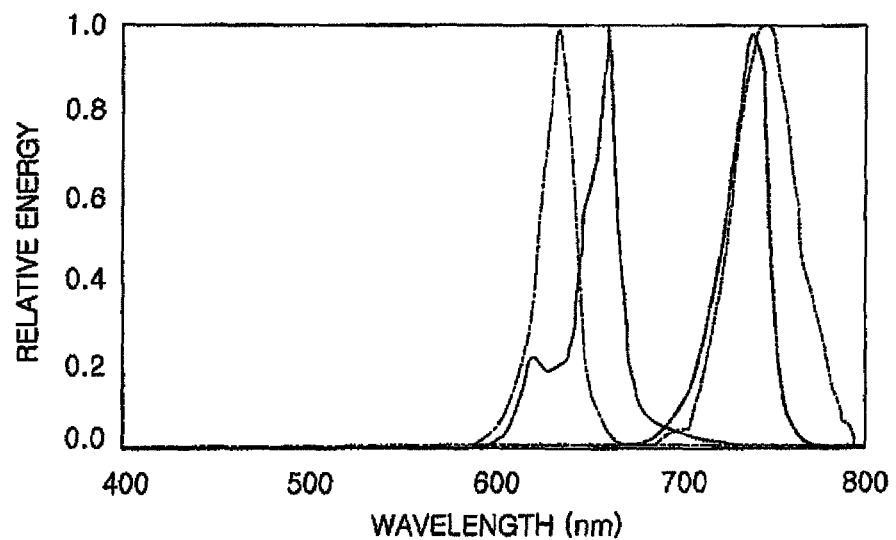
FIG. 2 is a view showing spectral characteristics of light emitted from a first light source and a second light source used in the above system.

The first light source 2 is preferably disposed above the plant P so as to irradiate the entire plant P with its light. The plant P is irradiated with red light having a peak wavelength in a range of 610 to 680 nm. The first light source 2 includes, for example, a fluorescent lamp 23 that emits lights having all the wavelengths in a visible-light region; and a red filter 21 passing only red light among the lights emitted from the fluorescent lamp 23 therethrough. Alternatively, the first light source 2 may include a red LED designed to emit the red light having a peak wavelength in a range of 610 to 680 nm, without including the red filter 21. As shown in FIG. 2, the fluorescent lamp 23 with the red filter 21 and the red LED, for example, can emit the red lights with peak wavelengths of about 660 nm and about 630 nm, respectively. The first light source 2 is not limited to the above but, for example, may include a red fluorescent lamp, an incandescent lamp or an HID lamp (e.g., a high pressure sodium lamp and a xenon lamp) with the red filter 21, and a red EL element.

The second light source 3 is preferably disposed above the plant P near the first light source 2, and irradiates the plant P with the far-red light having a peak wavelength in a range of 685 to 780 nm. The second light source 3, for example, includes a fluorescent lamp 33 that emits lights having all the wavelengths in a visible-light region; and a far-red filter 31 passing only far-red light among the lights emitted from the fluorescent lamp 33 therethrough. Alternatively, the second light source 3 may include a far-red LED designed to emit the far-red light having a peak wavelength in a range of 685 to 780 nm, without including the far-red filter 31. As shown in FIG. 2, the fluorescent lamp 33 with the far-red filter 31 and the far-red LED, for example, can emit the far-red lights with peak wavelengths of about 740 nm and about 735 nm, respectively. The second light source 3 is not limited to the above but, for example, may include a far-red fluorescent lamp, an incandescent lamp or an HID lamp (e.g., a high pressure sodium lamp and a xenon lamp) with the far-red filter 31, and a far-red EL element.

The first light source 2 and the second light source 3 may be realized by controlling wavelengths of light emitted from a single light source. For instance, this may be realized in such a way that the red filter 21 and the far-red filter 31 are disposed with respect to the fluorescent lamp, which emits both of the red and far-red lights, and are exchanged with each other (not shown).

The control part 4 has, for example, a microcomputer, relays, switches, and the like. Further, the control part 4 may include a dimmer (not shown) for modulating the irradiance of the light emitted from each of the first light source 2 and the second light source 3. The dimmer includes a light controller, and controls electrically the irradiance of the light emitted from each of the first light source 2 and the second light source 3. In order to obtain a sufficient growth-promoting effect to the plant P, the second light source 3 preferably irradiates the plant P with far-red light of which irradiance around the plant P is 0.02 $W/m^2$ or more and integral irradiance per day is 0.2 $kJ/m^2$ or more. The first light source 2 preferably irradiates the plant P with red light of which irradiance is higher than or equal to that of the second source 3, but its irradiation power is particularly not limited. The irradiance may be measured by using the light meter Li-250 and the sensor Li-200 SA manufactured by Leica.

The time setting part 5 is designed such that the first light source 2 starts irradiating the plant P with the red light at a time zone before sunset; and the second light source 3 starts irradiating the plant P with the far-red light at the time when the red light irradiation of the first light source 2 is completed. Accordingly, in the time zone near sunset, the plant is continuously irradiated with the red light emitted from the first light source 2 and the far-red light emitted from the second light source 3.

The time setting part 5 is designed such that each of the first light source 2 and the second light source 3 starts or stops the light irradiation at a pre-set time, for example, by utilizing a timer, a microcomputer, or the like. The time setting part 5 may be provided with a photo-sensor to detect an irradiance of natural light (sunlight) emitted around the plant P by using the photo-sensor, whereby the starting or stopping time of the light irradiation of each of the first light source 2 and the second light source 3 is determined. Further, the time setting part 5 may be provided with a solar-time switch, and according to sunrise and sunset time pre-memorized in the solar-time switch, may determine the time of starting or stopping the light irradiation of each of the first light source 2 and the second light source 3.

Figure 3:
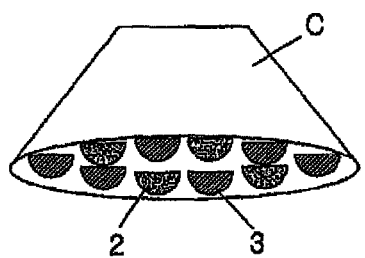
FIG. 3 is a perspective view of an irradiation unit in which the first light source and second light source are incorporated into one housing.

As shown in FIG. 3, a plurality of the first light sources 2 and the second light sources 3 may be incorporated in a single housing C. At this time, the first light sources 2 and the second light sources 3 are preferably arranged alternately so as to irradiate wider areas with more uniform light.

Figure 4:
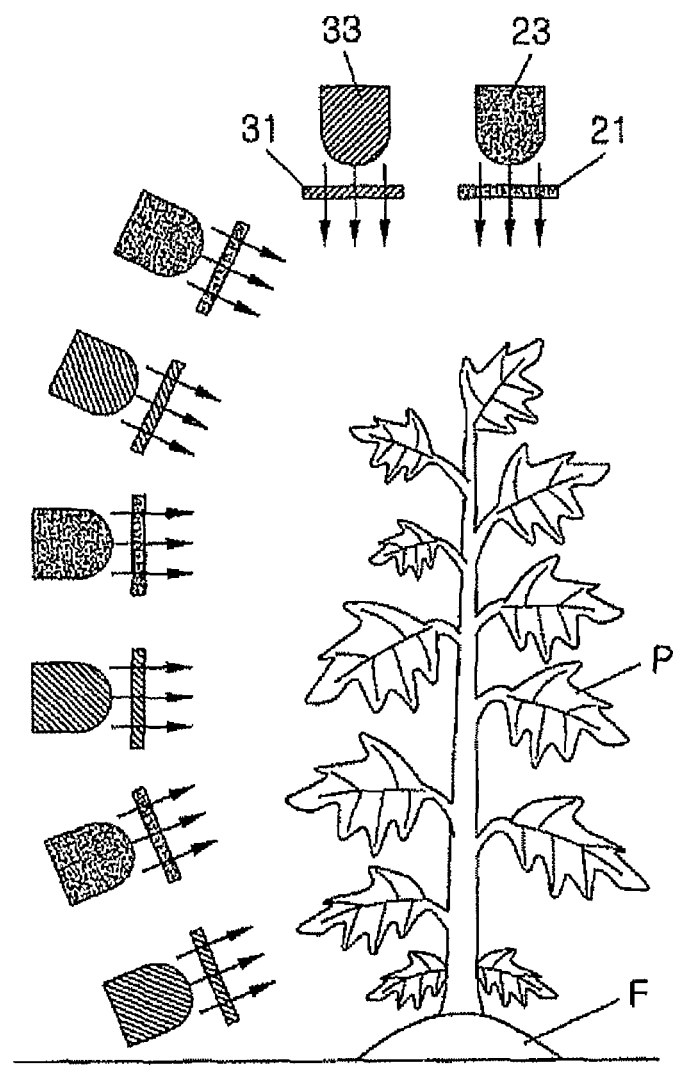
FIG. 4 is a front view of an irradiation system in which the first light sources and the second light sources employed in the above system are disposed at an upper side, a middle side, and a lower side of the plant.

Meanwhile, in cases where the plant P is tall and/or has a lot of branches and leaves, the light emitted from the first light source 2 and the second light source 3 can hardly reach a lower part and/or inner portions of the plant P. In this case, as shown in FIG. 4, the first light sources 2 and second light sources 3 are preferably disposed at a middle side and a lower side of the plant P, in addition to an upper side of the plant P. Thus, by the first light sources 2 and the second light sources 3 the plant P can be irradiated with more uniform and strong light, without depending on the shape of the plant P. At this time, the first light sources 2 and the second light sources 3, which are disposed at the middle and lower sides of the plant P, are preferably configured such that their mounting angles can be adjustable so as to irradiate the plant P at desired angles.

Figure 5:
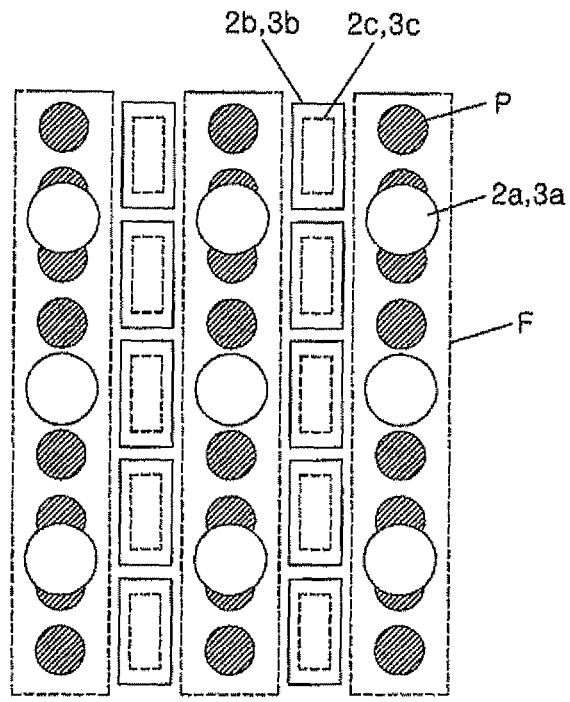
FIG. 5 is a top view of the irradiation system in which the first light source and second light source employed in the above system are disposed at the upper side, the middle side, and the lower side of the plant.

As shown in FIG. 5, upper light sources 2a and upper light sources 3a are respectively the first light source 2 and the second light source 3 disposed above the plant P. The upper light sources 2a and the upper light sources 3a, for instance, are disposed right above the plant P at regular intervals along a direction in which a ridge F is extended. Further, lateral light sources 2b and lateral light sources 3b are respectively the first light source 2 and the second light source 3 respectively disposed at the middle side of the plant P. The lateral light sources 2b and the lateral light sources 3b, for instance, are disposed at the middle side of the plant P at regular intervals between the ridges F along the direction in which the ridge F is extended. Besides, lower light sources 2c and lower light sources 3c are respectively the first light source 2 and the second light source 3 disposed at the lower side of the plant P. The lower light sources 2c and the lower light source 3c are disposed on the ground at regular intervals between the ridges F along the direction in which the ridge F is extended. The lateral light sources 2b, 3b and the lower light sources 2c, 3c are waterproofed and, for example, are constituted by a continuum light source such as lighting equipment of hollow light guide type, an optical fiber, and EL device formed into an elongated shape.

The upper light source 2a, the lateral light source 2b, and the lower light source 2c may be adjustable in light distribution and light volume according to the growth of the plant P. For instance, in cases where the plant P is still small (the beginning of a growth stage), the upper light source 2a, apart from the plant P, is turned off and the lateral light source 2b and the lower light source 2c, near the plant P, are turned on. At this time, the lateral light source 2b and the lower light source 2c preferably change their mounting angles to make their light distributions narrow, so that the plant P is irradiated with focused light. Further, the plant P at the beginning of a growth stage is not fully developed in branch and leave, so the light irradiated to the plant P can reach all over the plant P even if the light volume is lower. Therefore, it is preferable to decrease the amount of the light emitted from the lateral light source 2b and the lower light source 2c.

On the other hand, in cases where the plant P has grown enough, all of the upper light sources 2a, lateral light sources 2b, and the lower light sources 2c are turned on. At this time, the lateral light source 2b and the lower light source 2c preferably change their mounting angles to make their light distribution wider, so that a wider range of the plant P is irradiated with the light. Further, the fully developed plant P has a lot of branches and leaves, so the light irradiated to the plant P may not reach inside the plant P if the light volume is not enough. Therefore, it is preferable to increase the amount of the light emitted from the upper light source 2a, the lateral light source 2b, and the lower light source 2c.

A chrysanthemum (Seyprinse), belonging to flowering plants, is used as the plant P, and growth promoting effects of the plant growing system 1 on the chrysanthemum is examined. The chrysanthemum was cultivated for approximately four months, i.e., from planting at the end of October to harvesting on the next February. After the planting, in order to maintain nutrition growth of the chrysanthemum, four hours discontinuation of a dark phase was carried out by lighting on an incandescent lamp at midnight until the beginning of December (approximately 45 days after starting the planting, in which the chrysanthemum has a height of 20 cm or more). After the discontinuation of the dark phase had been completed, the chrysanthemum was transferred to reproduction growth, and simultaneously the light irradiation to the chrysanthemum was started by the first light source 2 and the second light source 3. This light irradiation was continued until the chrysanthemum bloomed. The first light source 2 and the second light source 3 respectively include red LEDs disposed above the chrysanthemum at a density of 40 pieces/m$^2$; and far-red LEDs disposed above the chrysanthemum at a density of 20 pieces/m$^2$.

Figure 6:
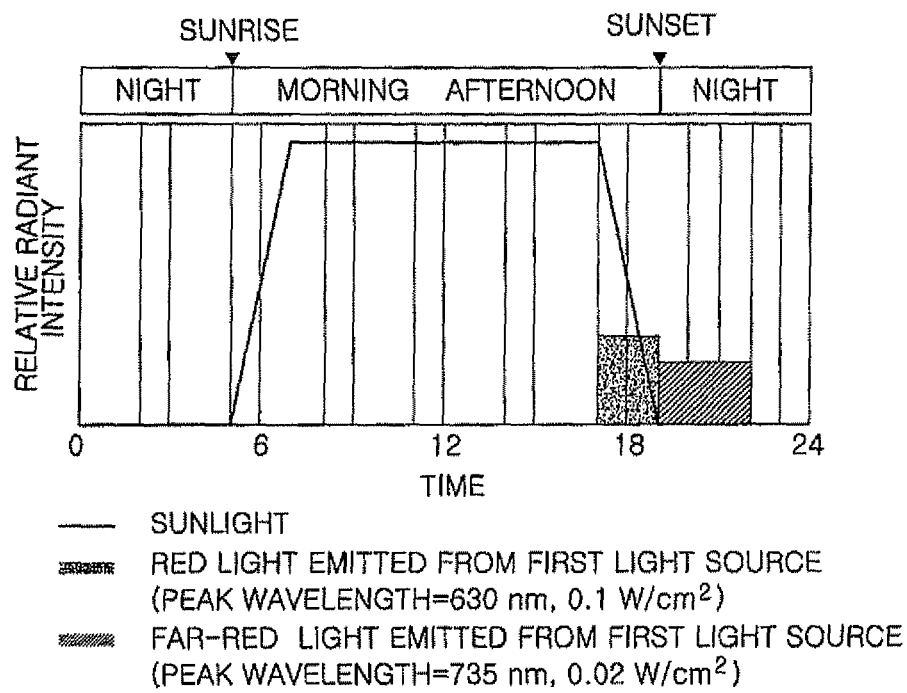
FIG. 6 is a view showing an example of a photo-irradiation pattern of the first light source and the second light source in an example utilizing the above system.

As shown in FIG. 6, in this example, the chrysanthemum was irradiated from 2 hours before sunset until sunset with the red light having a peak wavelength of 630 nm, emitted from the first light source 2, at irradiance of approximately 0.1 W/m$^2$. After the red light irradiation was completed, the chrysanthemum was irradiated from right after sunset until 3 hours after sunset with the far-red light with a peak wavelength of 735 nm, emitted from the second light source 3, at irradiance of approximately 0.02 W/m2.

Growth promoting effects of the plant growing system 1 on the chrysanthemum is evaluated in such a way that average days required for 80 percent or more of the chrysanthemums grown by using the present system to have 80 cm or more stems in height are compared to those of the comparative example. As the comparative examples, a first case where the chrysanthemum was irradiated with no red light from the first light source 2 and no far-red light from the second light source 3 (comparative example 1), a second case where the chrysanthemum was irradiated with only red light from the first light source 2 (comparative example 2), and a third case where the chrysanthemum was irradiated with only far-red light from the second light source 3 (comparative example 3) are employed.

Figure 7:
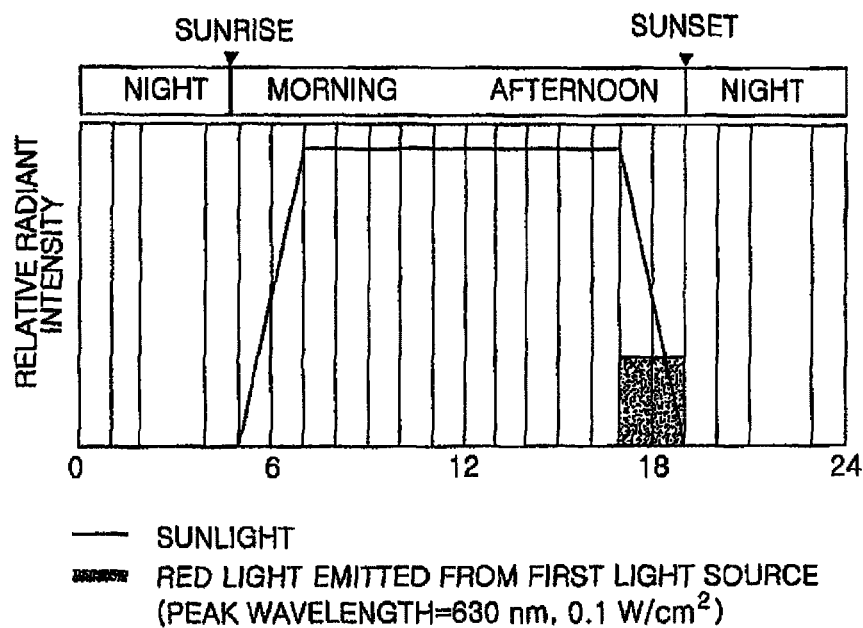
FIG. 7 is a view showing an example of a photo-irradiation pattern of the first light source in a comparative example relative to the example utilizing the above system.

As shown in FIG. 7, in the comparative example 2, the chrysanthemum was irradiated from 2 hours before sunset until sunset with the red light having a peak wavelength of 630 nm, emitted from the first light source 2, at irradiance of approximately 0.1 W/m$^2$.

Figure 8:
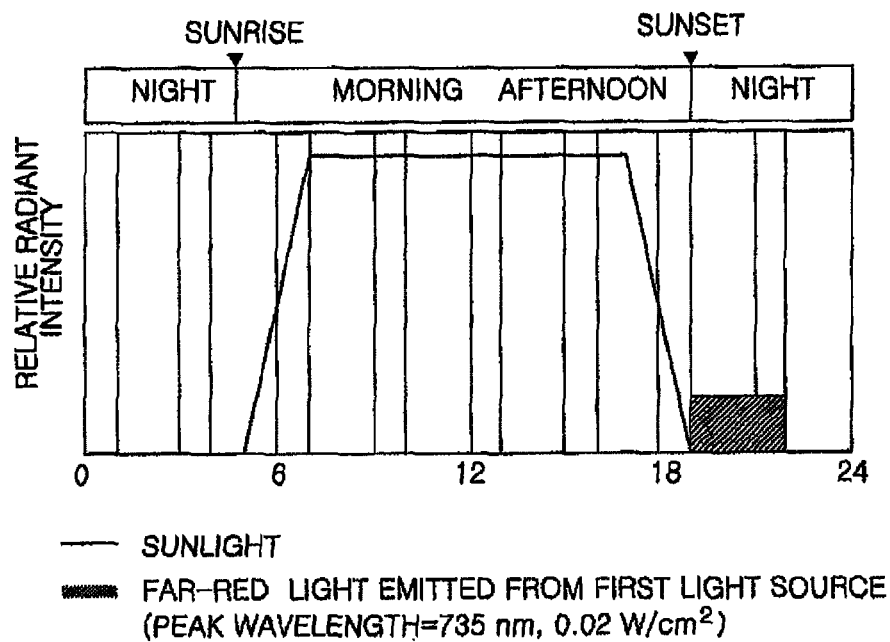
FIG. 8 is a view showing an example of a photo-irradiation pattern of the second light source in the comparative example relative to the example utilizing the above system.

As shown in FIG. 8, in the comparative example 3, the chrysanthemum was irradiated from right after sunset until 3 hours after sunset with the far-red light having a peak wavelength of 735 nm, emitted from the second light source 3, at irradiance of approximately 0.02 W/m$^2$.

As shown in the comparative example 1 of Table 1, 102 days were required, on average, for 80 percent or more of the chrysanthemums irradiated with no red light from the first light source 2 and no far-red light from the second light source 3, i.e., only natural light (sunlight) to have 80 cm or more stems in height. Further, as shown in the comparative example 2, when the chrysanthemum was irradiated with the red light from the first light source 2 in addition to the natural light, the growth of the chrysanthemum was accelerated slightly, so that 97 days were required for 80 percent or more of the chrysanthemums to have 80 cm or more stems in height. Furthermore, as shown in the comparative example 3, when the chrysanthemum was irradiated with the far-red light from the second light source 3 in addition to the natural light, the growth of the chrysanthemum was accelerated to some extent, so that 91 days were required for 80 percent or more of the chrysanthemums to have 80 cm or more stems in height. With respect to these comparative examples, in the present embodiment, when the chrysanthemum was irradiated continuously with the red light from the first light source 2 and the far-red light from the second light source 3 in addition to the natural light, only 83 days were required, on average, for 80 percent or more thereof to have 80 cm or more stems in height. This result shows that the plant growing system 1 can accelerate growth of a chrysanthemum effectively.

TABLE 1

| Target | Days required for chrysanthemum to have 80 cm or more stems in height |
| --- | --- |
| Comparative example 1: irradiation of natural light | 102 days |
| Comparative example 1: irradiation of natural light and red light | 97 days |
| Comparative example 1: irradiation of natural light and far-red light | 91 days |
| Embodiment: irradiation of natural light and continuous irradiation of red light and far-red light | 83 days |

Though the plant growing system 1 is applicable throughout the year, it is effective especially in a short day term, i.e., from autumn to the beginning of spring, in which natural light (sunlight) decreases.

According to the plant growing system 1 in accordance with the present embodiment, the time setting part 5 is designed such that the plant P is irradiated continuously before and after sunset with the red light from the first light source 2 and the far-red light from the second light source 3. The continuous irradiation to the plant P around sunset with the red light and the far-red light accelerates growth of the plant P remarkably.

In the first embodiment, the continuous irradiation with the red light and the far-red light is employed as an example, but the present invention is not limited thereto. The red light irradiation and the far-red light irradiation may be, for example, performed at regular intervals, or superimposed for a period of time. Further, in the first embodiment, the red light irradiation is switched over to the far-red light irradiation at sunset time as an example, but the present invention is not limited thereto. The red light irradiation may be switched over to the far-red light irradiation at any time around sunset. Furthermore, in the first embodiment, 2 hours irradiation and 3 hours irradiation are employed as irradiation time of the red light and the far-red light respectively, but the present invention is not limited thereto. Any irradiation time, if sufficient integral irradiance is obtained, may be employed.

Second Embodiment

A plant growing system in accordance with a second embodiment of the present invention will be described with reference to FIG. 9 to FIG. 11. The plant growing system is employed when plants (especially, flowering plants) are grown in institution cultivation such as a plastic greenhouse or a glasshouse for agriculture, and outdoor cultivation.

Figure 9:
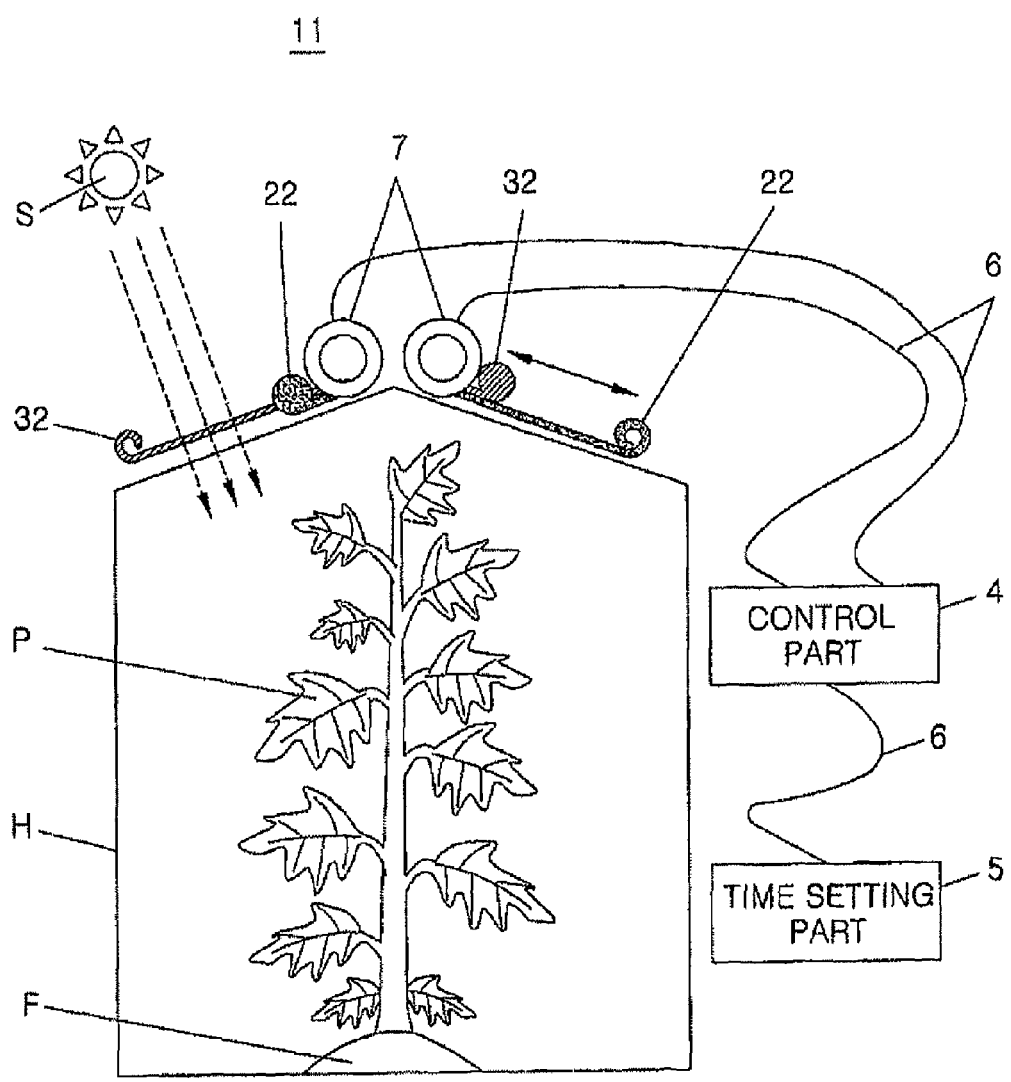
FIG. 9 is a front view showing a structure of a plant growing system in accordance with a second embodiment of the present invention.

As shown in FIG. 9, in the plant growing system 11, a first light source and a second light source include respectively a red filter 22 and a far-red filter 32. The plant growing system 11 includes the red filter 22 and the far-red filter 32, a control part 4 that controls opening and closing operations of these filters, and a time setting part 5 that pre-sets a time zone in which the control part 4 opens and closes the filters. An opening-and-closing driving unit 7 driven by a motor opens and closes the filters. Herein, the control part 4 is electrically connected to the opening-and-closing driving unit 7 and the time setting part 5 through respective power lines 6.

The red filter 22 and the far-red filter 32 transmit only red light and far-red light of sunlight, respectively. Then, the red light and the far-red light enter into the plastic greenhouse H in which the plant P, planted in a ridge F, is grown. Therefore, the red filter 22 and the far-red filter 32 are typically disposed between the sun S emitting sunlight and the plant P, such as on a roof of the plastic greenhouse H.

In case where the sunlight is reflected on the ground around the plastic greenhouse H to enter the plastic greenhouse H, however, the red filter 22 and the far-red filter 32 may be disposed on a side wall of the plastic greenhouse H, for example. Thus, from the reflected light, the red light and the far-red light can also be made. In order to utilize the reflected light actively, in the plant growing system 11, a light reflector for reflecting the sunlight into the plastic greenhouse H may be provided around the plastic greenhouse H.

In order to obtain sufficient growth promoting effects to the plant P, the second light source including the far-red filter 32 preferably irradiates the plant P with far-red light of which irradiance around the plant P is 0.5 W/m$^2$ or more and integral irradiance per day is 1 kJ/m$^2$ or more. The first light source 2 including the red filter 22 preferably irradiates the plant P with the irradiance higher or equal to that of the second source, but especially its emission power is not limited.

Each of the red filter 22 and the far-red filter 32 may transmit red light with mainly a wavelength in a range of 610 to 680 nm and far-red light with mainly a wavelength in a range of 685 to 780 nm, respectively. The red filter 22 and the far-red filter 32, in view of agricultural use, preferably include a colored agricultural film, although they may include, e.g., a color vinyl film, a resin film, color glass, or an optical-multilayered filter.

Figure 10:
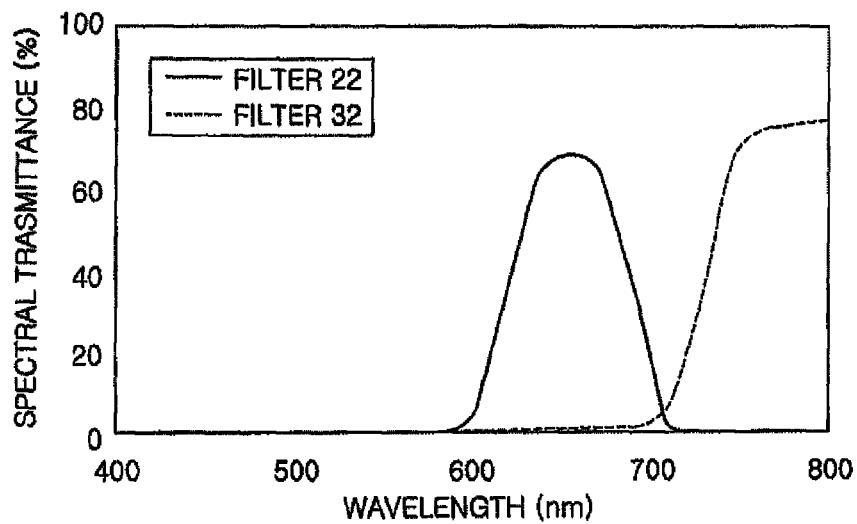
FIG. 10 is a view showing spectral characteristics of the sunlight passed through a filter employed in the above system.
Figure 11:
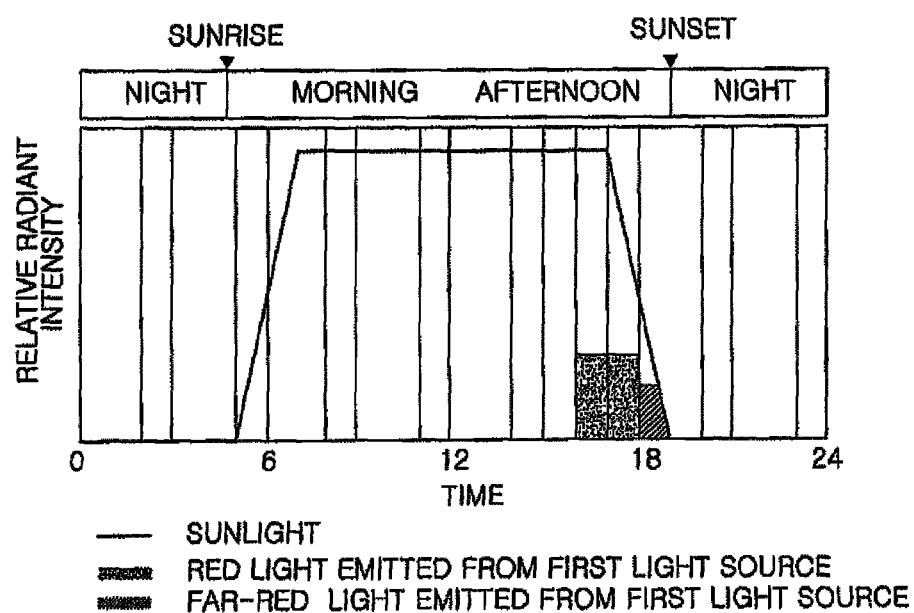
FIG. 11 is a view showing an example of a photo-irradiation pattern of the first light source and the second light source that are employed in the above system.

As shown in FIG. 10, the red filter 22, for example, transmits the red light with a wavelength in a range of approximately 600 to 700 nm among sunlight and cuts off the other lights, which have wavelengths other than the above range. The far-red filter 32, for example, transmits the far-red light with a wavelength in a range of approximately 700 nm or more among sunlight and cuts off the other lights, which have wavelengths other than the above range.

The first light source including the red filter 22, for example, irradiates the plant P with the red light for 2 hours, i.e., from 3 hours before sunset until 1 hour before sunset. The second light source including the far-red filter 32, for example, irradiates the plant P with the far-red light for 1 hour, i.e., from 1 hour before sunset until the sunset.

Although not shown in FIG. 9 in detail, it is designed such that the red filter 22 is expanded over the whole roof of the plastic greenhouse H, or over the whole roof and side wall thereof from 3 hours before sunset until 1 hour before sunset; and the far-red filter 32 is expanded over the whole roof of the plastic greenhouse H, or over the whole roof and side wall thereof from 1 hour before sunset until sunset.

With the plant growing system 11 in accordance with the second embodiment, the red light and the far-red light irradiated to the plant P can be obtained from sunlight through the filtering operation of the red filter 22 and the far-red filter 32, without requiring electric power. Therefore, the plant growing system 11 is excellent in power saving as compared with the plant growing system 1 that generates red light and far-red light through an electric lamp. No electric lamps are needed to generate the red light and the far-red light in the second embodiment, thereby more simplifying electrical circuits in the system.

In the second embodiment, the continuous irradiation by the red light and the far-red light is also employed as an example, but the present invention is not limited thereto. The red light irradiation and the far-red light irradiation may be, for example, performed at regular intervals, or superimposed for a period of time.

Further, in the second embodiment, the red light irradiation is switched over to the far-red light irradiation at 1 hour before sunset as an example, but the present invention is not limited thereto. The red light irradiation may be switched over to the far-red light irradiation at any time before sunset.

Furthermore, in the first embodiment, 2 hours irradiation and 1 hour irradiation are employed as irradiation time of the red light and the far-red light respectively, but the present invention is not limited thereto. Any irradiation time, if sufficient integral irradiance is obtained, may be employed.

The plant growing system in accordance with the present invention can be modified variously. For instance, the number of light sources employed in the present system is not limited to that of the above embodiments, but may be increased or decreased if necessary. Further, as the light source in the present system, the electric lamp used in the first embodiment and the filter used in the second embodiment, which transmits sunlight, may be used together.

While the invention has been shown and described with respect to the embodiments, it will be understood by those skilled in the art that various changes and modification may be made without departing from the scope of the invention as defined in the following claims.

What is claimed is:

1. A plant growing system, comprising:
    a first light source for irradiating red light to a plant;
    a second light source for irradiating far-red light to the plant;
    a control part that controls irradiating operations of the first light source and the second light source; and
    a time setting part that sets a time zone in which the control part operates the first light source and the second light source,
    wherein the time setting part is designed such that the first light source starts red light irradiation before sunset; and the second light source starts far-red light irradiation after the red light irradiation.

2. The plant growing system as set forth in claim 1,
    wherein the time setting part is designed such that the second light source starts the far-red light irradiation after the red light irradiation of the first light source is completed.

3. The plant growing system as set forth in claim 1,
    wherein the first light source has a peak wavelength in a range of 610 to 680 nm and the second light source has a peak wavelength in a range of 685 to 780 nm.

4. The plant growing system as set forth in claim 1,
    wherein the first light source and the second light source are realized by controlling a wavelength of light emitted from a single light source.

5. The plant growing system as set forth in claim 1,
    wherein the second light source emits the far-red light with irradiance of 0.02 W/m$^2$ or more and integral irradiance per day of 0.2 kJ/m$^2$ or more.

6. The plant growing system as set forth in claim 1,
    wherein the time setting part is designed such that the first light source emits the red light until a first time zone near sunset; and the second light source emits the far-red light until a second time zone near sunset.

7. The plant growing system as set forth in claim 1,
    wherein each of the first light source and the second light source includes a filter through which sunlight passes; and the second light source emits far-red light with irradiance of 0.5 W/m$^2$ or more and integral irradiance per day of 1 kJ/m$^2$ or more.

8. The plant growing system as set forth in claim 1,
    wherein the time setting part is designed such that the second light source emits the far-red light from near the end of red light irradiation of the first light source until near sunset.

9. The plant growing system as set forth in claim 7,
    wherein the filter of the first light source is a red filter through which the red light with a wavelength in a range of 610 to 680 nm is passed and the filter of the second light source is a far-red filter through which the far-red light with a wavelength in a range of 685 to 780 nm is passed.

* * * * *